US012121943B2

(12) United States Patent
Hua et al.

(10) Patent No.: US 12,121,943 B2
(45) Date of Patent: Oct. 22, 2024

(54) CLEANING APPARATUS AND METHOD FOR QUARTZ TUBE

(71) Applicant: ZHICHENG SEMICONDUCTOR EQUIPMENT TECHNOLOGY (KUNSHAN) CO., LTD., Suzhou (CN)

(72) Inventors: Bin Hua, Suzhou (CN); Xunbing Zhou, Suzhou (CN); Bangyong Wan, Suzhou (CN); Wenxuan Li, Suzhou (CN)

(73) Assignee: ZHICHENG SEMICONDUCTOR EQUIPMENT TECHNOLOGY (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 17/913,129

(22) PCT Filed: May 9, 2022

(86) PCT No.: PCT/CN2022/091639
§ 371 (c)(1),
(2) Date: Sep. 20, 2022

(87) PCT Pub. No.: WO2023/035642
PCT Pub. Date: Mar. 16, 2023

(65) Prior Publication Data

US 2024/0216964 A1 Jul. 4, 2024

(30) Foreign Application Priority Data

Sep. 10, 2021 (CN) ......................... 202111059562.X

(51) Int. Cl.
*B08B 9/032* (2006.01)
*B08B 9/023* (2006.01)
*F26B 21/00* (2006.01)

(52) U.S. Cl.
CPC ............ *B08B 9/0325* (2013.01); *B08B 9/023* (2013.01); *F26B 21/004* (2013.01); *B08B 2209/032* (2013.01)

(58) Field of Classification Search
None
See application file for complete search history.

(56) References Cited

U.S. PATENT DOCUMENTS 2,225,272 A * 12/1940 Horne ..................... B08B 9/023 15/104.03
2004/0000327 A1 * 1/2004 Somboli ............ C23C 16/4407 134/198

(Continued)

FOREIGN PATENT DOCUMENTS

CN 101352714 A 1/2009
CN 106424038 A * 2/2017 ........... B01D 50/002

(Continued)

*Primary Examiner* — Spencer E. Bell
*Assistant Examiner* — Omair Chaudhri
(74) *Attorney, Agent, or Firm* — CBM PATENT CONSULTING, LLC

(57) ABSTRACT

A cleaning apparatus for a quartz tube includes a cleaning cover with an opening in a bottom, a base vertically assembled with the cleaning cover through movable inserting, a bearing table arranged in the base and holding the quartz tube, and a driving apparatus; a top of the cleaning cover has a first nozzle; a side wall of the cleaning cover vertically has multiple second nozzles; the bearing table vertically has an inner spray tube; a top and a side of the inner spray tube above the bearing table have multiple third nozzles; a rotary sealing apparatus is embedded in the base; the inner spray tube continuously and vertically penetrates through the bearing table and the rotary sealing apparatus; the driving apparatus drives the bearing table to rotate; the inner spray tube remains stationary during rotation of the bearing table.

10 Claims, 7 Drawing Sheets

(56) References Cited

U.S. PATENT DOCUMENTS

| | | | | |
|---|---|---|---|---|
| 2016/0298235 | A1 | 10/2016 | Terasaki et al. | |
| 2019/0344205 | A1* | 11/2019 | Hicks | B08B 9/00 |
| 2019/0380483 | A1* | 12/2019 | Raborn | B08B 5/02 |
| 2021/0339296 | A1* | 11/2021 | Hu | B08B 7/0057 |
| 2023/0263361 | A1* | 8/2023 | Wu | A47L 15/4278 134/184 |
| 2024/0081607 | A1* | 3/2024 | Kim | A47L 15/4214 |

FOREIGN PATENT DOCUMENTS

| | | | | |
|---|---|---|---|---|
| CN | 106824929 | A | | 6/2017 |
| CN | 206509301 | U | | 9/2017 |
| CN | 210546830 | U | * | 5/2020 |
| CN | 210614566 | U | | 5/2020 |
| CN | 213103610 | U | | 5/2021 |

* cited by examiner

CLEANING APPARATUS AND METHOD FOR QUARTZ TUBE

TECHNICAL FIELD

The disclosure relates to the technical field of cleaning devices for semiconductor device consumables, in particular to a cleaning apparatus and method for a quartz tube.

BACKGROUND

Quartz tubes are semiconductor device consumables commonly used in semiconductor apparatus manufacturing devices (for example, chemical vapor deposition (CVD), physical vapor deposition (PVD), diffusion (Diff) or thin-film forming (T/F) devices). After the quartz tubes are used in the above-mentioned semiconductor devices for a period of time, a large amount of dirt, metal impurities or solid particles may be left on inner wall surfaces of the quartz tubes. However, the quartz tubes are expensive, so they are required to be reused after being thoroughly cleaned, so as to reduce the manufacturing cost of semiconductor apparatuses.

After searching, the applicant found that the Chinese invention patent with the Publication No. being CN101181711A discloses an automatic vertical quartz tube cleaning machine and a cleaning technology thereof. In the prior art, a quartz tube (i.e. a workpiece) is supported on a turntable by a workpiece support, is cleaned by means of spray tubes oppositely mounted on both sides of the turntable and a tubular nozzle hoisted at a top, and is placed, with an opening facing upwards, on the turntable.

First of all, cleaning of large-diameter quartz tubes cannot be realized by the prior art, especially for the quartz tubes made of 8-inch and 12-inch wafers, the volumes and masses of the quartz tubes are large. In the prior art, the quartz tube with the opening facing upwards is fixed in the cleaning machine. Therefore, after the tubular nozzle at the top injects deionized water (DIW) or a cleaning agent into the opening of the quartz tube, the weight of the whole quartz tube may be huge, which may seriously affect the stability of the quartz tube when it is driven and rotated by the turntable and increase the energy consumption, and there is a defect of serious waste of the deionized water. In addition, objectively, the cleaning apparatus has the poor cleaning effect on an inner wall surface of the quartz tube due to the fact that the liquid is stored in the quartz tube. Secondly, in the prior art, the quartz tube is required to be supported on the turntable by the workpiece support, so that a contact portion of an outer wall surface of the quartz tube which is in contact with the workpiece support is shielded by the workpiece support, and there is a defect that the outer wall surface of the quartz tube cannot be effectively cleaned; and the turntable needs to bear the huge pressure exerted by the quartz tube and the liquid stored inside the quartz tube, which easily results in failure of the turntable and damage to the turntable. Finally, the applicant also pointed out that only the quartz tube in a specific diameter can be cleaned by the prior art, and the outer wall surface of the quartz tube may rub against the workpiece support in the rotation process of the quartz tube, so that scratches are caused on the outer wall surface of the quartz tube in the cleaning process, and the needs of cleaning the quartz tubes in different diameters cannot be met.

In view of this, it is necessary to improve the cleaning apparatus for cleaning the quartz tube in the prior art, so as to solve the above-mentioned problems.

SUMMARY

The disclosure aims to disclose a cleaning apparatus for a quartz tube and a method for cleaning the quartz tube on the basis of the cleaning apparatus for the quartz tube, so as to overcome multiple defects of a cleaning apparatus for a quartz tube in the prior art, and is especially used for realizing efficient cleaning of quartz tubes in various sizes, reducing the use amount of cleaning agents such as deionized water and the like, simplifying the structure of the cleaning apparatus for the quartz tube, prolonging the service life of the cleaning apparatus for the quartz tube, and avoiding damage to the quartz tubes in a cleaning process.

In order to achieve one of the above-mentioned purposes, the disclosure provides the cleaning apparatus for the quartz tube, the cleaning apparatus comprising:

a cleaning cover with an opening formed in a bottom, a base assembled with the cleaning cover in a movably inserted manner in a vertical direction, a bearing table arranged in the base and holding the quartz tube, and a driving apparatus, wherein a top of the cleaning cover is provided with a first nozzle; a side wall of the cleaning cover is vertically provided with a plurality of second nozzles; the bearing table is vertically provided with an inner spray tube; a top and a side of the inner spray tube that are located above the bearing table are provided with a plurality of third nozzles; the base is provided with a rotary sealing apparatus in an embedded manner; the inner spray tube continuously penetrates through the bearing table and the rotary sealing apparatus in the vertical direction; the driving apparatus drives the bearing table to rotate; and the inner spray tube remains stationary during rotation of the bearing table.

As a further improvement of the disclosure, at least two layers of positioning bosses having gradually-reduced diameters and arranged in a gradually raised manner are formed upwards on the bearing table in the vertical direction; a plurality of notches are formed on edges of the positioning bosses.

As a further improvement of the disclosure, the top and the side of the inner spray tube that are located above the bearing table are provided with the plurality of third nozzles that spray and form cylindrical jet beams matching an inner cavity of the quartz tube;

and the cleaning apparatus for the quartz tube further comprises a switching apparatus connected to the first nozzle, the second nozzles and the inner spray tube, wherein the switching apparatus is connected to a cleaning liquid storage apparatus and a gas source, so that the first nozzle, the second nozzles and the third nozzles are controlled by the switching apparatus to spray a cleaning liquid and/or gas.

As a further improvement of the disclosure, a receiving groove for receiving an edge of the opening of the bottom of the cleaning cover is formed on an edge of the base; the cleaning cover is arranged in the receiving groove in an inverted manner; a lateral opening is formed in an annular side wall of the cleaning cover; and the cleaning cover is provided with a sliding cover plate for movably opening or closing the lateral opening.

As a further improvement of the disclosure, the cleaning apparatus for the quartz tube further comprises an upper mounting plate and a lower mounting plate arranged up and down in parallel, wherein the driving apparatus is arranged on the lower mounting plate; the base is embedded in the upper mounting plate;

the base comprises a bottom plate and an inner annular wall arranged annularly from the bottom plate and arranged upwards, wherein the inner annular wall extends radially outwards and horizontally to form a bottom wall; an outer annular wall vertically and annularly enclosing the bottom wall is formed on an outer side of the bottom wall; and the receiving groove is defined by the inner annular wall, the bottom wall and the outer annular wall.

As a further improvement of the disclosure, the outer annular wall extends in the vertical direction to form an upper outer annular wall and a lower outer annular wall; the upper mounting plate transversely abuts against an outer wall of the inner annular wall and protrudes upwards to form an annular rib plate that is clamped with the lower outer annular wall; the upper outer annular wall in the vertical direction is higher than a top edge of the inner annular wall; and a bottom of the inner annular wall that is close to the bottom plate is provided with a plurality of drainage holes.

As a further improvement of the disclosure, a plurality of first notches are formed in a top of the inner annular wall, and a plurality of second notches are formed in the bottom of the cleaning cover, so that air circulation channels are built by means of the first notches and the second notches.

As a further improvement of the disclosure, the driving apparatus comprises an electric motor, a reversing apparatus, a driving wheel, a synchronous belt, and a driven wheel driving the bearing table and located at the bottom of the base; and upper and lower ends of the inner spray tube in the vertical direction protrude out of the bearing table and the driven wheel respectively.

As a further improvement of the disclosure, an inner wall of the cleaning cover is provided with an air hole and a baffle that transversely shields the air hole; the bottom plate is provided with a circular table in an upwards protruded manner; the bearing table is arranged above the circular table; and the diameter of the bearing table is larger than that of the circular table.

As a further improvement of the disclosure, the rotary sealing apparatus comprises an adapter cylinder arranged coaxially and longitudinally and supporting the bearing table, a water isolation ring arranged above the circular table, an inner sleeve vertically and longitudinally inserted into the adapter cylinder and sleeved with the driven wheel, and a bearing block fixed to a bottom of the circular table;

the inner sleeve is transversely provided with an annular rib in a protruding manner; a portion of the inner sleeve that is located above the annular rib is longitudinally inserted into an annular gap formed between the adapter cylinder and the inner spray tube; a portion of the inner sleeve that is located below the annular rib penetrates through the bearing block downwards, and the driven wheel is sleeved on a bottom end of the inner sleeve; a plurality of bearings are arranged between the annular rib and the bearing block; and a plurality of first sealing rings are embedded in an end face of the water isolation ring that faces the circular table.

As a further improvement of the disclosure, the rotary sealing apparatus further comprises a second sealing ring arranged above the bearing table and enclosing the inner spray tube and a locking ring pressing the second sealing ring.

As a further improvement of the disclosure, a first buffer ring, a second buffer ring and a rigid bottom plate which are arranged in an attached manner from top to bottom are integrally embedded in the bottom of the bearing table, and the rigid bottom plate is fixedly connected to the adapter cylinder.

On the basis of the same disclosure purpose, the present application further discloses a cleaning method for the quartz tube, wherein the quartz tube in an inverted state is cleaned and dried sequentially by means of the cleaning apparatus for the quartz tube according to any one of above-mentioned disclosures.

Compared with the prior art, the disclosure has the beneficial effects that first of all, in the present application, the top of the cleaning cover is provided with the first nozzle, the side wall of the cleaning cover is vertically provided with the plurality of second nozzles, the bearing table is vertically provided with the inner spray tube, the top and the side of the inner spray tube that are located above the bearing table are provided with the plurality of third nozzles, the quartz tube rotates in a vertical posture on the bearing table during cleaning and drying, and the at least two layers of positioning bosses having the gradually-reduced diameters and arranged in the gradually raised manner are formed upwards on the bearing table in the vertical direction, so that efficient cleaning of quartz tubes in various sizes is realized, the use amount of cleaning agents such as deionized water and the like is reduced, and the needs of cleaning the quartz tubes in different diameters can be met; and secondarily, by means of the rotary sealing apparatus in the present application, the structure of the cleaning apparatus for the quartz tube is simplified, the service life of the cleaning apparatus for the quartz tube is prolonged, and damage to the quartz tubes in the cleaning process is avoided.

DETAILED DESCRIPTION OF THE EMBODIMENTS

Figure 1:
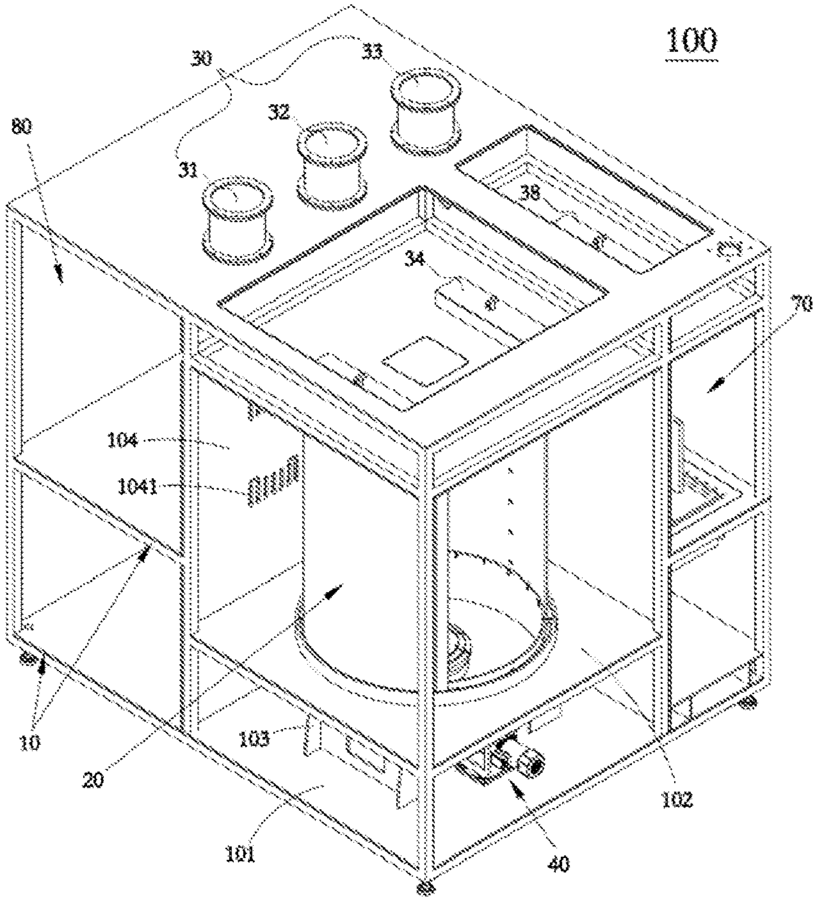
FIG. 1 is a stereogram of a cleaning apparatus for a quartz tube of the disclosure.

The disclosure will be described in detail below in combination with embodiments shown in the drawings. However, it should be noted that these embodiments are not limitations on the disclosure, and equivalent transformations or substitutions, made by those of ordinary skill in the art according to these embodiments, in functions, methods or structures are within the scope of protection of the disclosure.

It should be noted that when one element is deemed to be "connected" to another element, it may be directly connected to another element, or there may be an intermediate element at the same time. Unless otherwise defined, all technical and scientific terms used herein have the same meanings as those generally understood by those skilled in the art of the disclosure. The terms used in the description of the disclosure herein are only for the purpose of describing specific embodiments and are not intended to limit the disclosure. The term "and/or" as used herein includes any and all combinations of one or more related listed items.

It should be understood that the orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", "positive direction", "negative direction" and the like are orientations or positional relationships based on the drawings, are only for the purpose of facilitating describing of the technical solution and simplifying the description, and do not indicate or imply that the indicated apparatus or elements must have specific orientations or be constructed and operated in specific orientations. Therefore, they cannot be understood as limitations on the technical solution.

Embodiment 1

Refer to a specific embodiment of a cleaning apparatus for a quartz tube 100 of the disclosure shown in FIG. 1 to FIG. 10. The cleaning apparatus for the quartz tube 100 is used for cleaning and drying the quartz tube in a vertical posture and having one end open or both ends open, and is particularly applicable to cleaning and drying of a bell type quartz tube having an open structure at only one end and commonly used in semiconductor apparatus manufacturing devices such as chemical vapor deposition (CVD), physical vapor deposition (PVD), diffusion (Diff) or thin-film forming devices (T/F) used for preparing 8-inch or larger wafers.

Figure 8:
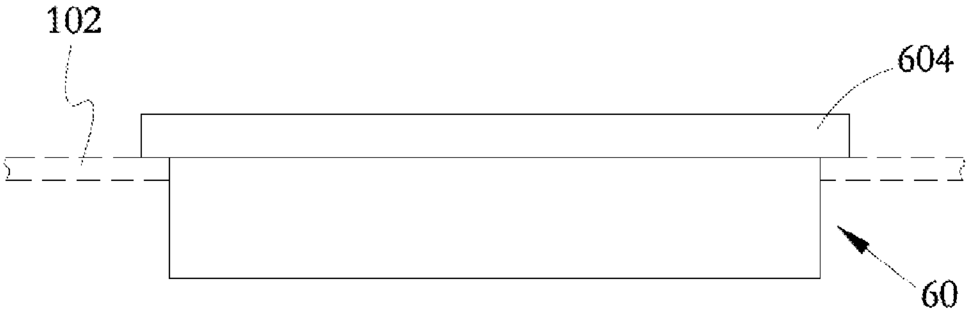
FIG. 8 is a partial schematic view of a base embedded in an upper mounting plate.
Figure 9:
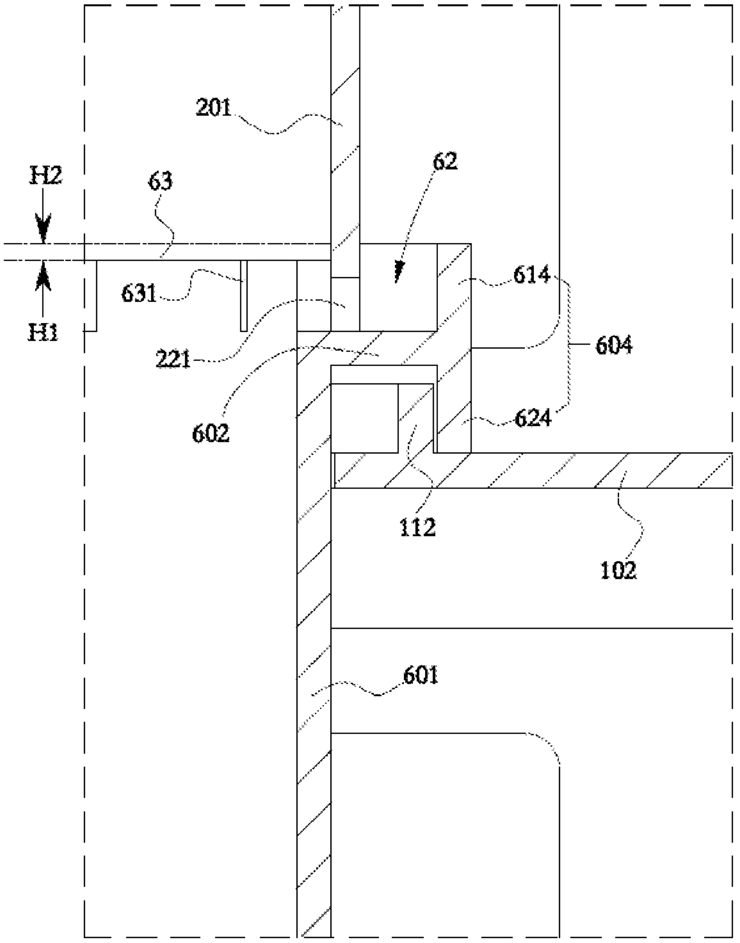
FIG. 9 is a partial enlarged view of a dashed box D in FIG. 3.
Figure 10:
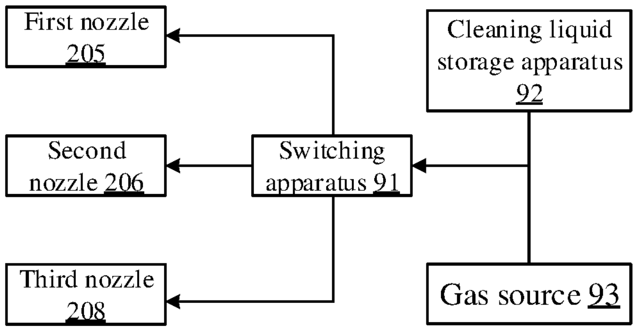
FIG. 10 is a schematic view of a switching apparatus connected to a first nozzle, second nozzles and an inner spray tube and connected to a cleaning liquid storage apparatus and a gas source.

In combination with FIG. 8 and FIG. 9, in this embodiment, the cleaning apparatus for the quartz tube 100 comprises a cleaning cover 20 with an opening formed in a bottom, a base 60 assembled with the cleaning cover 20 in a movably inserted manner in a vertical direction, a bearing table 21 arranged in the base 60 and holding the quartz tube 50, and a driving apparatus. The cleaning cover 20 and the base 60 may be separated longitudinally in the vertical direction (in a direction shown by an axis C in FIG. 4), which not only facilitates assembly of the cleaning apparatus for the quartz tube 100, but also facilitates removal of the cleaning cover 20 and maintenance and cleaning of the cleaning cover 20. The base 60 is in a disc shape and has an opening formed in a top, and the base 60 is embedded in an upper mounting plate 102, so that the base 60 is isolated by the upper mounting plate 102 and has a partial supporting effect. An outer annular wall 604 is placed on a surface of the upper mounting plate 102.

Figure 2:
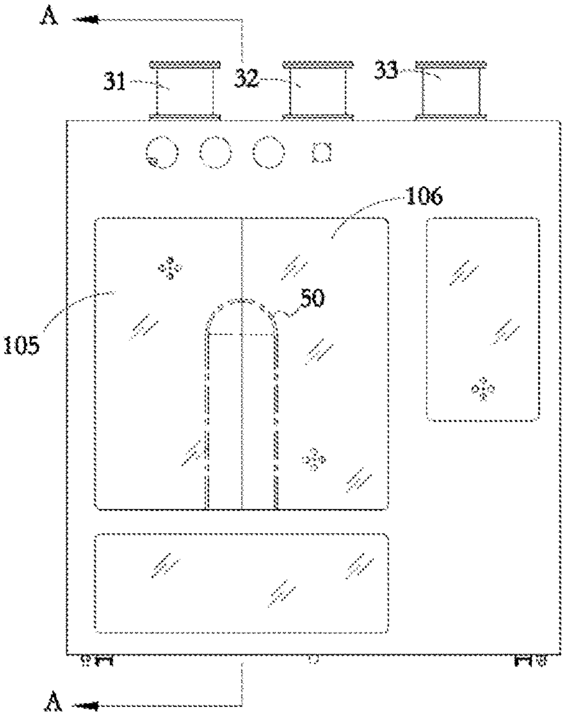
FIG. 2 is a front view of a cleaning apparatus for a quartz tube of the disclosure.
Figure 3:
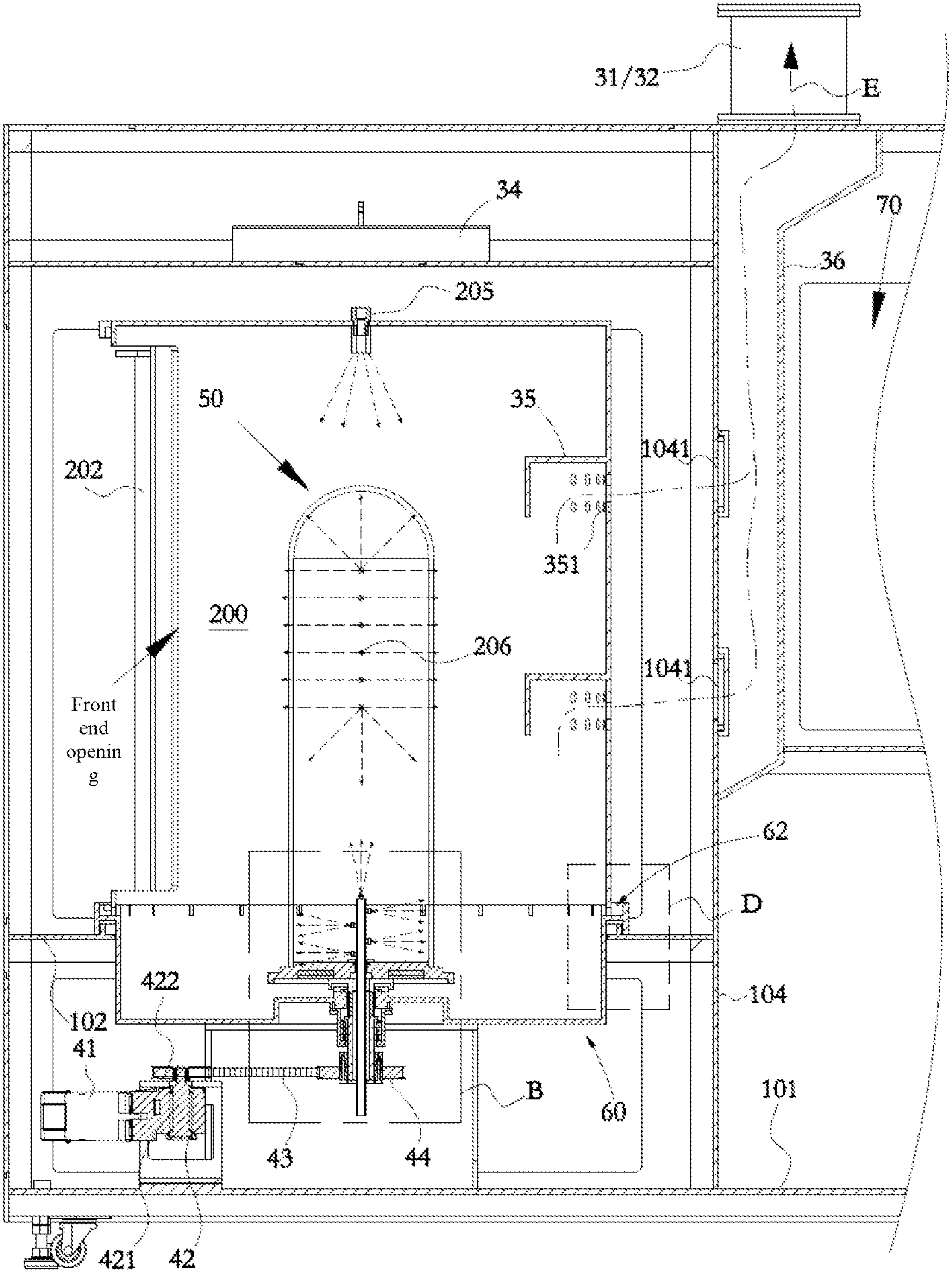
FIG. 3 is a sectional view taken along a line A-A in FIG. 2.

In combination with FIG. 1 to FIG. 3, the whole cleaning apparatus for the quartz tube 100 may be composed of a frame 10 made of an aluminum alloy or stainless steel, and a guard plate (not shown) is mounted on an outer wall of the frame 10. The inside of the cleaning apparatus for the quartz tube 100 includes a work area provided with the cleaning cover 20, a control area 70 provided with a control system (for example, a touch screen, a programmable logic controller (PLC), a power supply, etc.), and a supply area 80. A top of the work area is provided with an illuminating lamp 34, and a top of the control area is provided with an illuminating lamp 38. The work area is separated from the control area 70 and the supply area 80 by means of built-in guard plates 104, so as to prevent water or a corrosive cleaning agent in the work area from entering the control area. At the same time, the upper mounting plate 102 and a lower mounting plate 101 connected to the frame 10 and mounted horizontally are arranged in the work area, so that the cleaning cover 20 and the driving apparatus are isolated by means of the upper mounting plate 102. The guard plate 104 arranged between the work area and the supply area 80 is provided with a grid hole 1041, and the grid hole 1041 is connected to two suction and discharge interfaces 31, 32 at the top of the supply area 80 by means of a pipeline 36 located in the supply area 80; and similarly, the guard plate (not shown) arranged between the control area 70 and the supply area 80 is also provided with a grid hole, and the grid hole is connected to a suction and discharge interface 33 at the top of the supply area 80 by means of a pipeline 36 in the supply area 80. The suction and discharge interfaces 31-33 are connected to a gas purification apparatus (not shown), so as to discharge waste gas produced when the cleaning apparatus for the quartz tube 100 is used for cleaning and drying the quartz tube. The whole lower mounting plate 101 bears the driving apparatus.

In order to facilitate description of the solution of this embodiment, the applicant uses the viewing angle shown in FIG. 2 as the main viewing angle of the cleaning apparatus for the quartz tube 100. A door body 105 and a door body 106 made of transparent corrosion-resistant plastic may be assembled on the frame 10 in the direction of a lateral opening formed by movable opening and closing of the cleaning cover 20.

The quartz tube 50 in an inverted posture is placed in the cleaning cover 20 to be cleaned and dried, and the quartz tube 50 may be embedded in the bearing table 21 in a manual or mechanical arm loading manner. It should be noted that in this embodiment, end faces of the door body 105 and the door body 106 are set as front ends, and the whole supply area 80 is located at a rear end of the cleaning apparatus for the quartz tube 100 and is used for introducing deionized water (DIW), nitrogen and a cleaning agent into the whole cleaning apparatus for the quartz tube 100 and providing necessary auxiliary devices, such as filtering, heating, circulation and discharge devices, for the above-mentioned deionized water (DIW), nitrogen and cleaning agent. Since the above-mentioned auxiliary devices are all prior art, the description thereof is omitted in this embodiment.

In combination with FIG. 3, in this embodiment, a top of the cleaning cover 20 is provided with a first nozzle 205, an inner side of a side wall of the cleaning cover 20 is vertically provided with a plurality of second nozzles 206, the bearing table 21 is vertically provided with an inner spray tube 45, and a top and a side of the inner spray tube 45 that are located above the bearing table 21 are provided with a plurality of third nozzles 208. The base 60 is provided with a rotary sealing apparatus in an embedded manner, and the inner spray tube 45 continuously penetrates through the bearing table 21 and the rotary sealing apparatus in the vertical direction. The driving apparatus drives the bearing table 21 to rotate, and the inner spray tube 45 remains stationary during rotation of the bearing table 21. The first nozzle 205 sprays the deionized water or nitrogen (or isopropanol (IPA) vapor) so as to clean or dry an arc-shaped top of the quartz tube 50; the plurality of second nozzles 206 are vertically arranged to spray the deionized water or nitrogen (or IPA vapor) so as to clean or dry an outer side wall of the quartz tube 50; and the plurality of third nozzles 208 are arranged at the top and the side of the inner spray tube 45 to spray the deionized water or nitrogen (or IPA vapor) so as to clean and dry an inner side wall and an inner top wall of the quartz tube 50. At the same time, in this embodiment, the length of the inner spray tube 45 may be replaced and/or adjusted according to the length of the quartz tube 50 in the direction of an axis C. Dashed arrows formed by spraying the deionized water or nitrogen (or IPA vapor) by the first nozzle 205, the second nozzles 206 and the third nozzles 208 in FIG. 3 are only exemplary.

Figure 4:
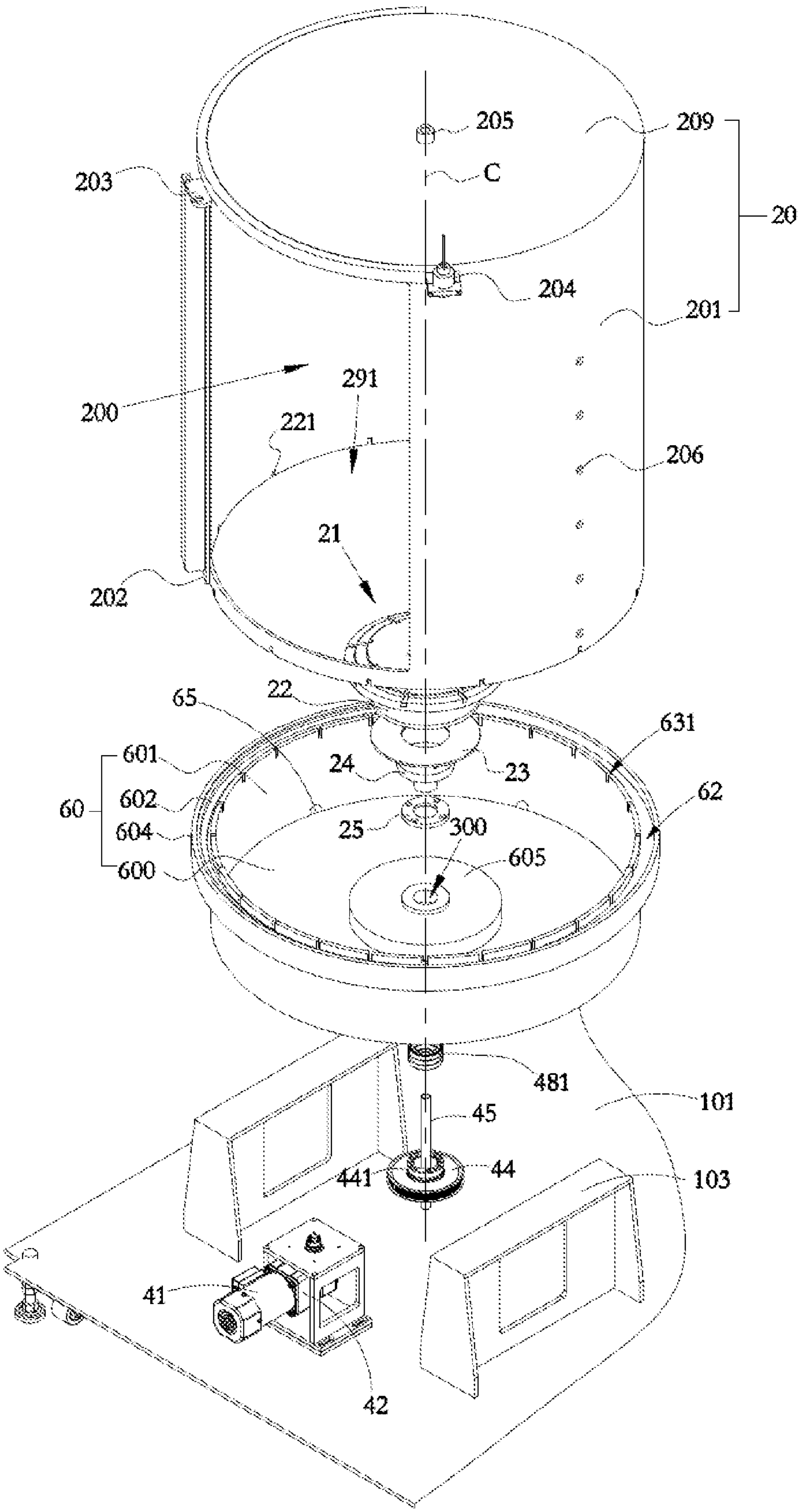
FIG. 4 is a three-dimensional exploded view of a cleaning cover and a driving apparatus at a bottom of the cleaning cover in a vertical direction.

In combination with FIG. 3 and FIG. 4, the driving apparatus comprises an electric motor 41, a reversing apparatus 42, a driving wheel 422, a synchronous belt 43, and a driven wheel 44 driving the bearing table 21 and located at the bottom of the base 60. Upper and lower ends of the inner spray tube 45 in the vertical direction protrude out of the bearing table 21 and the driven wheel 44 respectively. Horizontal rotational power output by the electric motor 41 is converted into rotational power in the vertical direction by the reversing apparatus 42, so as to drive the driving wheel 422 to rotate horizontally. The reversing apparatus 42 is internally provided with a reversing gear set (not shown) and drives the driving wheel 422 by means of a rotating shaft 421. The electric motor 41 and the reversing apparatus 42 are integrally mounted on the lower mounting plate 101. The lower mounting plate 101 is provided with two symmetrically-arranged supports 103 below the base 60, so as to support the base 60 by means of the two supports 103. At the same time, the length of the inner spray tube 45 extending into an inner cavity of the quartz tube 50 may be determined according to the length of the quartz tube 50, and a base (not shown) for holding the inner spray tube 45 may be arranged at a bottom of the inner spray tube 45 as long as the inner spray tube 45 can be fixed longitudinally and the height of the inner spray tube 45 can be adjusted in a receiving channel 300.

Figure 7:
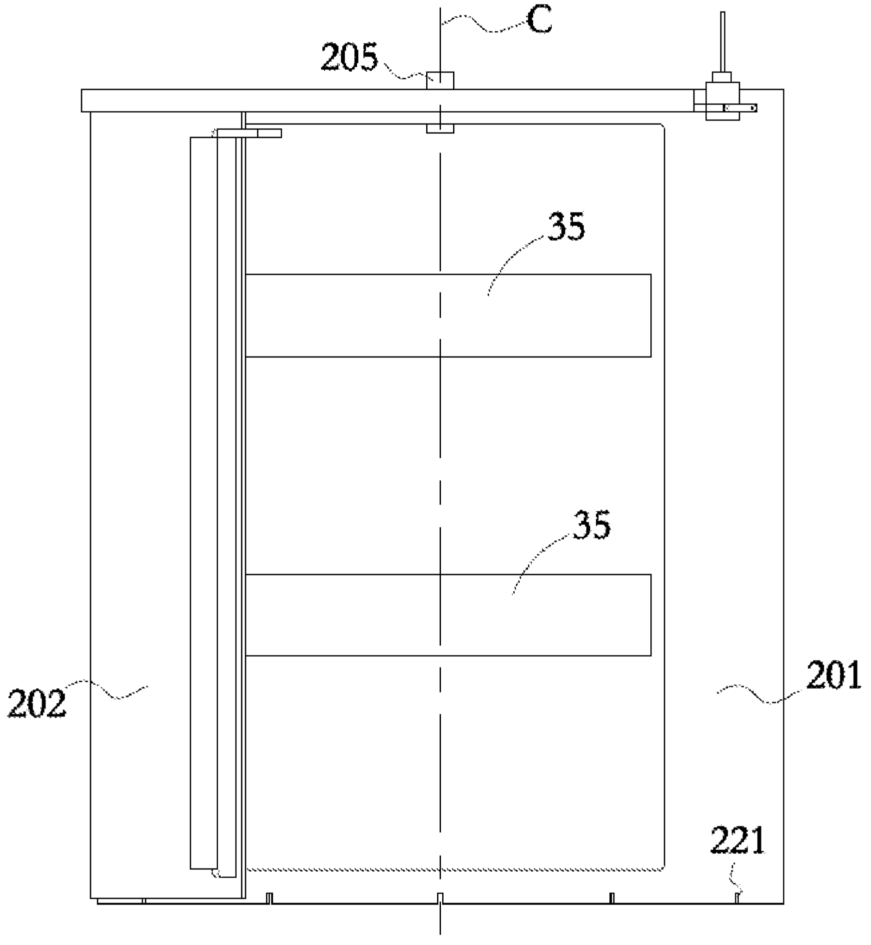
FIG. 7 is a front view of a bearing table located inside a cleaning cover and configured to bear a quartz tube.

In combination with FIG. 3 and FIG. 7, an inner wall of the cleaning cover 20 is provided with an air hole 351 and a baffle 35 that transversely shields the air hole 351. Specifically, in this embodiment, a baffle 35 having a bent portion is transversely arranged on an arc-shaped inner wall surface far away from the cleaning cover 20 and located in an opposite direction of an opening movably opened or closed by the cleaning cover (i.e., close to the guard plate 104), so as to prevent a liquid from flowing into the pipeline 36 from the air hole 351. The air hole 351 discharges the waste gas, produced during cleaning and drying, from the suction and discharge interfaces 31, 32 through the grid hole 1041 of the guard plate 104 in the direction indicated by a dashed arrow E in FIG. 3. The control area 70 is provided with the same pipeline, so as to discharge, by means of the suction and discharge interface 33, a small amount of moisture that may be left in the control area 70.

Figure 5:
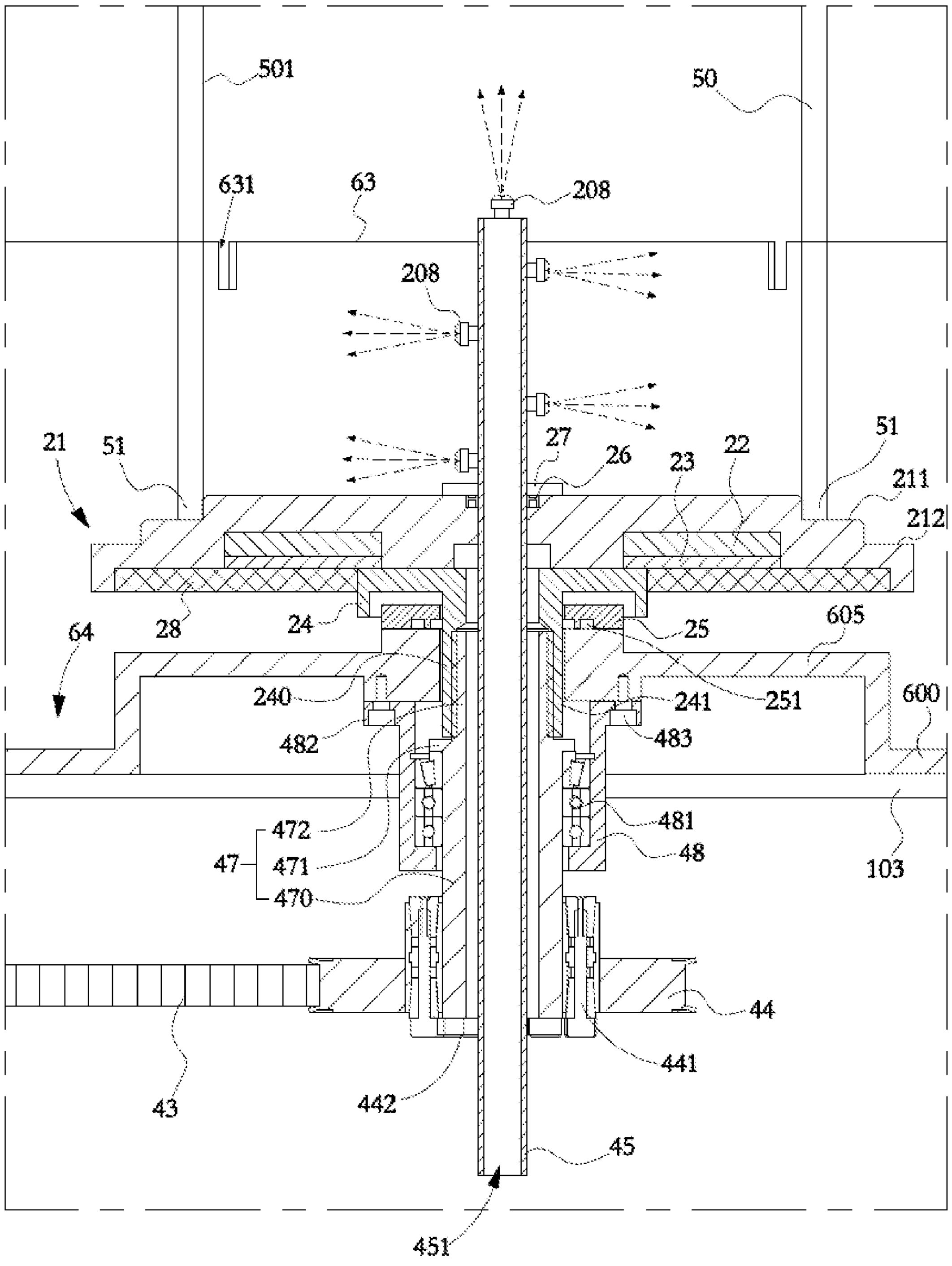
FIG. 5 is a partial enlarged view of a dashed box B in FIG. 3.

With reference to FIG. 4 and FIG. 5, in this embodiment, the rotary sealing apparatus comprises an adapter cylinder 24 arranged coaxially and longitudinally and supporting the bearing table 21, a water isolation ring 25 arranged above a circular table 605, an inner sleeve 47 vertically and longitudinally inserted into the adapter cylinder 24 and sleeved with the driven wheel 44, and a bearing block 48 fixed to a bottom of the circular table 605. The inner sleeve 47 is transversely provided with an annular rib 471 in a protruding manner, and a portion of the inner sleeve 47 that is located above the annular rib 471 is longitudinally inserted into an annular gap formed between the adapter cylinder 24 and the inner spray tube 45. A portion of the inner sleeve 47 that is located below the annular rib 471 penetrates through the bearing block 48 downwards, and the driven wheel 44 is sleeved on a bottom end of the inner sleeve 47. A plurality of bearings 481 are arranged between the annular rib 471 and the bearing block 48 and specifically include two ball bearings and one roller bearing. A plurality of first sealing rings 251 are embedded in an end face of the water isolation ring 25 that faces the circular table 605. Specifically, two circles of the first sealing rings 251 are arranged, and the first sealing rings 251 are arranged concentrically. A cylindrical portion 240 longitudinally extending through the circular table 605 is downwards formed on the adapter cylinder 24. The receiving channel 300 allowing the inner spray tube 45 to be vertically inserted in is formed in the circle center of the circular table 605 that is coaxially arranged with the axis C. The inner spray tube 45 in a vertical posture continuously penetrates through the bearing table 21, the circular table 605 and the rotary sealing apparatus, and extends downwards into an area between the upper mounting plate 102 and the lower mounting plate 101. The bottom of the inner spray tube 45 is provided with an opening 451 allowing liquid or gas to be introduced in. The bottom of the inner spray tube 45 is connected to a switching apparatus 91 by means of a pipeline. The circle center of the circular table 605 that is close to the inner spray tube 45 are provided with bosses in an upwards and downwards protruding manner, the boss arranged on the circular table 605 in the downwards protruding manner is provided with a blind hole having an inner thread, the bearing block 48 is transversely provided with an annular portion 482 fixedly assembled with the boss, arranged on the circular table 605 in the downwards protruding manner, in the direction of the axis C, the annular portion is provided with a circle of through holes 483, and then bolts (not shown) continuously penetrate through the through holes 483 and the blind hole, so as to realize reliable assembly of the bearing block 48 and the circular table 605. The inner sleeve 47 is longitudinally and vertically arranged and comprises an annular rib 471, an upper inner sleeve section 472 formed above the annular rib 471, and a lower inner sleeve section 470 formed below the annular rib 471. The upper inner sleeve section 472 is inserted, in the vertical direction, into an annular gap (not marked since the annular gap is small) between the cylindrical portion 240 and the inner spray tube 45, and may be connected longitudinally and reliably by means of a key. The driven wheel 44 is embedded in a bottom of the lower inner sleeve section 470. A positioning ring 441 is arranged between the driven wheel 44 and the lower inner sleeve section 470, so as to fix the lower inner sleeve section 470 and the driven wheel 44. An end cover 442 is embedded in an end at the bottom of the driven wheel 44, the end cover 442 is embedded at a top of the positioning ring 441, and the inner spray tube 45 extends vertically downwards through the end cover 442.

The driven wheel 44 is driven by the synchronous belt 43 to integrally drive the inner sleeve 47 to rotate, and then the inner sleeve 47 transmits the rotational power to the bearing table 21 by means of the adapter cylinder 24, so as to finally realize the rotational movement of the bearing table 21. Preferably, in this embodiment, the rotary sealing apparatus further comprises a second sealing ring 26 arranged above the bearing table 21 and enclosing the inner spray tube 45 and a locking ring 27 pressing the second sealing ring 26. A certain gap is formed between the locking ring 27 and an outer wall surface of the inner spray tube 45, and the liquid sprayed by the inner spray tube 45 through the third nozzles 208 is prevented, by means of the second sealing ring 26, from penetrating into the bearing table 21.

The top and the side of the inner spray tube 45 that are located above the bearing table 21 are provided with the plurality of third nozzles 208 that spray and form cylindrical jet beams matching the inner cavity of the quartz tube 50, so as to form the impact on an inner wall surface 501 of the quartz tube 50 by means of the cylindrical jet beams to achieve the good cleaning effect and drying effect. The cylindrical jet beams may be formed by the liquid and may also be formed by the gas. In combination with FIG. 10, the cleaning apparatus for the quartz tube 100 further comprises a switching apparatus 91 connected to the first nozzle 205, the second nozzles 206 and the inner spray tube 45. The switching apparatus 91 is connected to a cleaning liquid storage apparatus 92 and a gas source 93, so that the first nozzle 205, the second nozzles 206 and the third nozzles 208 are controlled by the switching apparatus 91 to spray a cleaning liquid and/or gas. The switching apparatus 91 may be realized by a solenoid valve mechanism capable of switching liquid and gas in the prior art, and the switching apparatus 91 is connected to a PLC (a subordinate concept of a control system) by means of a wire. The switching apparatus 91 is connected to the cleaning liquid storage device 92 and the gas source 93 by means of a pipeline, and the gas source 93 may be nitrogen or IPA vapor generated by an IPA vapor generator. All media (i.e., liquid media or gaseous media) sprayed by the first nozzle 205, the second nozzles 206 and the third nozzles 208 may be independently controlled.

Figure 6:
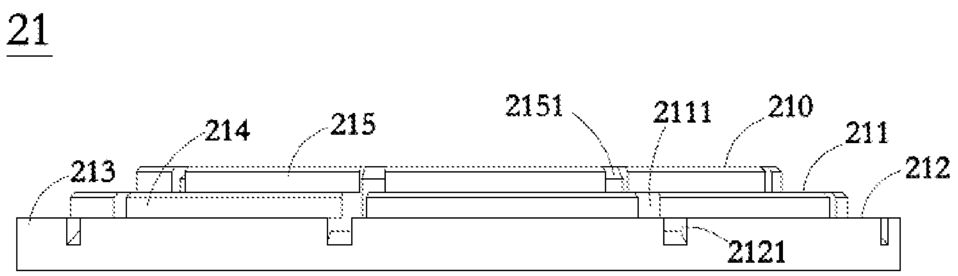
FIG. 6 is an exploded front view of a cleaning cover and a driving apparatus at a bottom of the cleaning cover in a vertical direction.

With reference to FIG. 3, FIG. 4 and FIG. 6, at least two layers of positioning bosses having gradually-reduced diameters and arranged in a gradually raised manner are formed upwards on the bearing table 21 in the vertical direction, and a plurality of notches are formed on edges of the positioning bosses. Specifically, in this embodiment, a positioning boss 214 at the bottom and a positioning boss 215 at the top are formed upwards on the bearing table 21 in the vertical direction, and a bearing bottom plate 213 extending transversely is formed at a bottom of the positioning boss 214. The bearing table 21 may be made of polytetrafluoroethylene (PTFE), the outer diameter of the positioning boss 214 is equal to the inner diameter of a quartz tube used for preparing a 12-inch wafer, the outer diameter of the positioning boss 215 is equal to the inner diameter of a quartz tube used for preparing an 8-inch wafer, and thus the two quartz tubes in different diameters are simultaneously inserted in one bearing table 21. Therefore, the bearing table 21 has the higher adaptability during use. When the quartz tube 50 used for the 12-inch wafer is cleaned and dried, an open lip 51 of the quartz tube 50 is pressed against an annular surface 212 of the bearing bottom plate 213. When the quartz tube used for the 8-inch wafer is cleaned and dried, the open lip 51 of the quartz tube 50 is pressed against an annular surface 211 of the positioning boss 214. A circular end face 210 above the positioning boss 215 is not in contact with the quartz tube 50.

The applicant points out that the bearing table 21 shown in FIG. 6 is only a typical example. As a reasonable transformation, the bearing table 21 may also be provided with more stages of positioning bosses, and the plurality of positioning bosses are arranged coaxially and are arranged in an upwards reduced manner, so as to prevent shaking or eccentric movement of the bearing table 21 during rotation. A circle of notches 2111 are formed on the edge of the positioning boss 214. A circle of notches 2121 are also formed on the edge of the bearing bottom plate 213. A circle of notches 2151 are formed on the edge of the positioning boss 215. In this embodiment, by means of the above-mentioned notches 2151, notches 2111 and notches 2121, the liquid or gas sprayed by the inner spray tube 45 can flow out of a shielded cavity, defined by the bearing table 21 and the quartz tube 50, via the notches 2151 or the notches 2111 or the notches 2121. This structure is not only beneficial to convenient fixation of the quartz tube 50 to the bearing table 21, but also beneficial to keeping internal and external pressure of the quartz tube 50 to prevent the liquid or the gas from breaking through the inserted connection relationship between the quartz tube 50 and the bearing table 21, so that the whole process that one end of the quartz tube 50 that is provided with the opening is inserted in the bearing table 21 to be rotated for cleaning and drying is more reliable and stable. At the same time, in the cleaning and drying process of the quartz tube 50, only the opening portion of the quartz tube 50 in the inverted state is embedded in the bearing table 21, the lip 51 of the quartz tube 50 and the positioning boss 214 (or the positioning boss 215) are clamped with each other, thus in the whole cleaning and drying process, the inner wall surface and an outer wall surface of the quartz tube 50 are not in contact with any apparatus or assembly in the cleaning cover 20 or the base 60, no scratches may be caused to the inner wall surface, the outer wall surface and the arc-shaped top of the quartz tube 50, and the cleaning effect on the quartz tube 50 is further improved.

A receiving groove 62 for receiving an edge of the opening of the bottom of the cleaning cover 20 is formed on an edge of the base 60, and the cleaning cover 20 is arranged in the receiving groove 62 in an inverted manner. The lateral opening is formed in an annular side wall 201 of the cleaning cover 20, and the cleaning cover 20 is provided with a sliding cover plate 202 for movably opening or closing the lateral opening. In combination with FIG. 4, the cleaning cover 20 is in a cylindrical shape as a whole and has the opening 291 formed in the bottom thereof and the top closed. A cylindrical receiving cavity 200 is formed inside the cleaning cover 20, and the quartz tube 50 with the opening formed in the bottom thereof is placed in a vertical posture in the receiving cavity 200 for cleaning and drying. Specifically, the cleaning cover 20 comprises a circular top plate 209, an arc-shaped side wall 201 inserted into the receiving groove 62, the arc-shaped side wall 201 being provided with a front end opening for loading or unloading the quartz tube 50, and a sliding cover plate 202 capable of rotating around the arc-shaped side wall 201 to movably open or close the front end opening. A top of the sliding cover plate 202 is provided with a positioning piece 203, a top of the arc-shaped side wall 201 that is located at the front end opening is provided with a sensor 204, and after the sliding cover plate 202 rotates along the arc-shaped side wall 201 and completely shields the front end opening, the positioning piece 203 moves to the position below the sensor 204, so as to prompt the control system (for example, the PLC) that the sliding cover plate 202 has completely shielded the front end opening and subsequent cleaning and drying may be started. Specifically, the sensor 204 may be a photoelectric sensor, a proximity sensor or a Hall sensor.

The cleaning apparatus for the quartz tube 100 further comprises the upper mounting plate 102 and the lower mounting plate 101 arranged up and down in parallel, the driving apparatus is arranged on the lower mounting plate 101, and the base 60 is embedded in the upper mounting plate 102. The base 60 comprises a bottom plate 600 and an inner annular wall 601 arranged annularly from the bottom plate 600 and arranged upwards, wherein the inner annular wall 601 extends radially outwards and horizontally to form a bottom wall 602; an outer annular wall 604 vertically and annularly enclosing the bottom wall 602 is formed on an outer side of the bottom wall 602; and the receiving groove 62 is defined by the inner annular wall 601, the bottom wall 602 and the outer annular wall 604. A plurality of first notches 631 are formed in a top of the inner annular wall 601, and a plurality of second notches 221 are formed in the bottom of the cleaning cover 20, so that air circulation channels are built by means of the first notches 631 and the second notches 221. The cross-sectional areas of the air circulation channels formed by the first notches 631 and the second notches 221 respectively are much smaller than the cleaning cover 20 and an arc-shaped side surface of the base 60. In this embodiment, the air circulation channels are built by the first notches 631 and the second notches 221, after the sliding cover plate 202 completely shields the lateral opening formed by the annular side wall 201, a gas flow path with an outer area of the cleaning cover 20 may be built by the aid of a circle of first notches 631 arranged annularly and a circle of second notches 221 arranged annularly, which is beneficial to balancing the internal and external air pressure of the cleaning cover 20, and especially when the quartz tube 50 is purged and dried with nitrogen, the air pressure balance effect is more remarkable; and at the same time, the above-mentioned first notches 631 and second notches 221 also have the function of returning the overflow liquid, and the structure design is exquisite and reasonable.

With reference to FIG. 5 and FIG. 9, in this embodiment, the outer annular wall 604 extends in the vertical direction to form an upper outer annular wall 614 and a lower outer annular wall 624, and the upper mounting plate 102 transversely abuts against an outer wall of the inner annular wall 601 and protrudes upwards to form an annular rib plate 112 that is clamped with the lower outer annular wall 624. The upper outer annular wall 614 in the vertical direction is higher than a top edge 63 of the inner annular wall 601, and a bottom of the inner annular wall 601 that is close to the bottom plate 600 is provided with a plurality of drainage holes 65. The distance between the top edge of the outer annular wall 604 (or the upper outer annular wall 614) and the bottom plate 600 is H2, and the distance between the top edge of the inner annular wall 601 and the bottom plate 600 is H1, and H2 is greater than H1. Thus, even when the liquid sprayed inside the cleaning cover 20 enters the receiving groove 62 via the first notches 631 and the second notches 221, it may be blocked by the outer annular wall 604 (or the upper outer annular wall 614), then return to the base 60 via the second notches 221 and the first notches 631 again, and finally be discharged via the drainage holes 65. The liquid left in the base 60 is discharged out of the cleaning apparatus for the quartz tube 100 via the drainage holes 65 by means of a pipeline (not shown). When the cleaning cover 20 is inserted in the base 60 in the direction of the axis C, the inner wall surface of the cleaning cover 20 is clamped with the outer wall surface of the inner annular wall 601. The base 60 is fixed by the supports 103, and the cleaning cover 20 can rotate relative to the base 60 in a horizontal direction.

In combination with FIG. 4 and FIG. 5, in this embodiment, the bottom plate 600 is provided with the circular table 605 in an upwards protruded manner, so that a circle of channel 64 is formed between the circular table 605 and the inner annular wall 601. The bearing table 21 is arranged above the circular table 605, and the diameter of the bearing table 21 is larger than that of the circular table 605. By means of the above-mentioned structure, the liquid produced during cleaning can be further directly dropped onto the bottom plate 600, be discharged via the drainage holes 65, and be prevented from entering the adapter cylinder 24, thereby further improving the reliability and prolonging the service life of the rotary sealing apparatus. To simplify the view, a rigid bottom plate 28 is omitted in FIG. 5.

A first buffer ring 22, a second buffer ring 23 and the rigid bottom plate 28 which are arranged in an attached manner from top to bottom are integrally embedded in the bottom of the bearing table 21, and the rigid bottom plate 28 is fixedly connected to the adapter cylinder 24. The first buffer ring 22 and the second buffer ring 23 may be made of elastic materials such as polyurethane and silica gel which are elastic and have good weather resistance such as acid-base corrosion resistance, so as to reduce vibration of the quartz tube 50 during loading, rotation and unloading, which objectively helps to ensure the stability of the quartz tube 50 during rotation on the bearing table 21. At the same time, the rigid bottom plate 28 may be made of a rigid material having good weather resistance (for example, SUS314 stainless steel and stainless steel of above specifications), and the bearing table 21 integrally wraps the first buffer ring 22, the second buffer ring 23 and an arc-shaped side surface of the rigid bottom plate 28. In this embodiment, the rigid bottom plate 28 is arranged, which well supports the bearing table 21 and is beneficial to assembly with the adapter cylinder 24. At the same time, the rigid bottom plate 28 is longitudinally separated from the circular table 605 in the vertical direction, and assembly of the bearing table 21, the first buffer ring 22, the second buffer ring 23 and the rigid bottom plate 28 is realized.

In this embodiment, the top of the cleaning cover 20 is provided with the first nozzle 205, the side wall of the cleaning cover 20 is vertically provided with the plurality of second nozzles 206, the bearing table 21 is vertically provided with the inner spray tube 45, the top and the side of the inner spray tube 45 that are located above the bearing table 21 are provided with the plurality of third nozzles 208, the quartz tube 50 rotates in the vertical posture on the bearing table 21 during cleaning and drying, and the at least two layers of positioning bosses having the gradually-reduced diameters and arranged in the gradually raised manner are formed upwards on the bearing table 21 in the vertical direction, so that efficient cleaning of the quartz tubes, used in various semiconductor manufacturing devices particularly applicable to preparation of 8-inch and larger wafers, in various sizes is realized, and the use amount of cleaning agents such as deionized water and the like is reduced; and secondarily, by means of introduction and optimized design of the rotary sealing apparatus, the structure of the cleaning apparatus for the quartz tube is simplified, the service life of the cleaning apparatus for the quartz tube is prolonged, damage to the quartz tube 50 in the cleaning process is effectively avoided, and scratches to the outer wall surface of the quartz tube 50 in the cleaning process can be particularly effectively avoided.

Embodiment 2

On the basis of the technical solution contained in the cleaning apparatus for the quartz tube disclosed in Embodiment 1, this embodiment discloses a cleaning method for the quartz tube based on the cleaning apparatus for the quartz tube as shown in Embodiment 1. According to the cleaning method for the quartz tube, the quartz tube in an inverted state is cleaned and dried sequentially by means of the cleaning apparatus for the quartz tube 100 as shown in Embodiment 1.

Specifically, in this embodiment, the quartz tube 50 in an inverted state is embedded on a bearing table 21, a first nozzle 205, second nozzles 206 and third nozzles 208 may simultaneously spray deionized water (DIW) or deionized water containing a cleaning agent, and the quartz tube 50 may be driven by the bearing table 21 to slowly rotate in a vertical posture at a rotational speed of 5-10 revolutions per minute and be cleaned for 5-10 minutes. After cleaning is completed, a gas supply mode is switched under the control of a switching apparatus 91 to spray nitrogen (or isopropanol (IPA) vapor) to a top (including a top outer wall surface and a top inner wall surface), an outer side wall and an inner side wall of the quartz tube 50 by means of the first nozzle 205, the second nozzles 206 and the third nozzles 208, so as to realize overall drying of the quartz tube 50.

Please refer to Embodiment 1 for the technical solutions of this embodiment that have the same parts as Embodiment 1, and the technical solutions will not be repeated here.

A series of detailed descriptions listed above are only specific descriptions of the feasible embodiments of the disclosure, and are not intended to limit the scope of protection of the disclosure. Any equivalent embodiments or changes not deviating from the technical spirit of the disclosure should be included in the scope of protection of the disclosure.

For those skilled in the art, it is obvious that the disclosure is not limited to the details of the above-mentioned exemplary embodiments, and the disclosure can be realized in other specific forms without deviating from the spirit or basic features of the disclosure. Therefore, for every point, the embodiments should be regarded as exemplary and non-limiting. The scope of the disclosure is limited by the appended claims rather than the above-mentioned descriptions. Therefore, it is intended to include all changes within the meanings and scope of equivalent elements of the claims in the disclosure. Any reference numerals in the claims should not be regarded as limiting the claims involved.

In addition, it should be understood that although the description is described in accordance with the embodiments, not every embodiment only contains an independent technical solution. This describing form of the description is only for the sake of clarity. Those skilled in the art should take the description as a whole, and the technical solutions in each embodiment can also be appropriately combined to form other embodiments that can be understood by those skilled in the art.

What is claimed is:

1. A cleaning apparatus for a quartz tube, comprising:

a cleaning cover (20) with an opening formed in a bottom thereof, a base (60) movably plugged and assembled with the cleaning cover (20) in a vertical direction, a bearing table (21) arranged in the base (60) and holding the quartz tube (50), and a drive apparatus, wherein a top of the cleaning cover (20) is provided with a first nozzle (205); a side wall of the cleaning cover is vertically provided with a plurality of second nozzles (206); the bearing table (21) is provided with a vertically extending inner spray tube (45); a top and a side of the inner spray tube (45) that are located above the bearing table (21) are provided with a plurality of third nozzles (208); the base (60) is provided with a rotary seal apparatus in an embedded manner; the inner spray tube (45) continuously penetrates through the bearing table (21) and the rotary seal apparatus in the vertical direction; the drive apparatus drives the bearing table (21) to rotate; the inner spray tube (45) remains stationary during rotation of the bearing table (21);

at least two layers of positioning bosses having gradually-reduced diameters and arranged in a gradually raised manner are formed upwards on the bearing table (21) in the vertical direction; a plurality of notches are formed on edges of the positioning bosses;

a receiving groove (62) for receiving an edge of the opening of the bottom of the cleaning cover is formed on an edge of the base (60); the edge of the opening of the bottom of the cleaning cover (20) is arranged in the receiving groove (62);

the cleaning apparatus for the quartz tube further comprises an upper mounting plate (102) and a lower mounting plate (101) arranged up and down in parallel, wherein the drive apparatus is arranged on the lower mounting plate (101); the base (60) is embedded in the upper mounting plate (102);

the base (60) comprises a bottom plate (600) and an inner annular wall (601) arranged annularly from the bottom plate (600) and arranged upwards, wherein the inner annular wall (601) extends radially outwards and horizontally to form a bottom wall (602); an outer annular wall (604) vertically and annularly enclosing the bottom wall (602) is formed on an outer side of the bottom wall (602); the receiving groove (62) is defined by the inner annular wall (601), the bottom wall (602) and the outer annular wall (604); and a plurality of first notches (631) are formed in a top of the inner annular wall (601), and a plurality of second notches (221) are formed in the bottom of the cleaning cover (20), so that air circulation channels are built by means of the first notches (631) and the second notches (221).

2. The cleaning apparatus for the quartz tube according to claim 1, wherein the top and the side of the inner spray tube (45) that are located above the bearing table (21) are provided with the plurality of third nozzles (208) that spray and form cylindrical jet beams matching an inner cavity of the quartz tube;

the cleaning apparatus for the quartz tube further comprises a switching apparatus (91) connected to the first nozzle (205), the second nozzles (206) and the inner spray tube (45), wherein the switching apparatus is connected to a cleaning liquid storage apparatus (92) and a gas source (93), so that the first nozzle (205), the second nozzles (206) and the third nozzles (208) are controlled by the switching apparatus (91) to spray a cleaning liquid and/or gas.

3. The cleaning apparatus for the quartz tube according to claim 1, wherein a lateral opening is formed in an annular side wall (201) of the cleaning cover (20), and the cleaning cover (20) is provided with a sliding cover plate (202) for movably opening or closing the lateral opening.

4. The cleaning apparatus for the quartz tube according to claim 1, wherein the outer annular wall (604) extends in the vertical direction to form an upper outer annular wall (614) and a lower outer annular wall (624); the upper mounting plate (102) transversely abuts against an outer wall of the inner annular wall (601) and protrudes upwards to form an annular rib plate (112) that is clamped with the lower outer annular wall (624); the upper outer annular wall (614) is higher than a top edge of the inner annular wall (601) in the vertical direction; and a bottom of the inner annular wall (601) that is close to the bottom plate (600) is provided with a plurality of drainage holes (65).

5. The cleaning apparatus for the quartz tube according to claim 1, wherein the drive apparatus comprises an electric motor (41), a reverse apparatus (42), a driving wheel (422), a synchronous belt (43), and a driven wheel (44) driving the bearing table (21) and located at the bottom of the base (60); and upper and lower ends of the inner spray tube (45) in the vertical direction protrude out of the bearing table (21) and the driven wheel (44) respectively.

6. The cleaning apparatus for the quartz tube according to claim 5, wherein an inner wall of the cleaning cover (20) is provided with an air hole (351) and a baffle (35) that transversely shields the air hole; the bottom plate (600) is provided with a circular table (605) in an upwardly protruded manner; the bearing table (21) is arranged above the circular table (605); and the diameter of the bearing table (21) is larger than that of the circular table (605).

7. The cleaning apparatus for the quartz tube according to claim 6, wherein the rotary seal apparatus comprises an adapter cylinder (24) arranged coaxially and longitudinally and supporting the bearing table (21), a water isolation ring (25) arranged above the circular table (605), an inner sleeve (47) vertically and longitudinally inserted into the adapter cylinder (24) and sleeved with the driven wheel (44), and a bearing block (48) fixed to a bottom of the circular table (605);

the inner sleeve (47) is transversely provided with an annular rib (471) in a protruding manner; a portion of the inner sleeve (47) that is located above the annular rib (471) is longitudinally inserted into an annular gap formed between the adapter cylinder (24) and the inner spray tube (45); a portion of the inner sleeve (47) that is located below the annular rib (471) penetrates through the bearing block (48) downwards, and the driven wheel (44) is sleeved on a bottom end of the inner sleeve (47); a plurality of bearings (481) are arranged between the annular rib (471) and the bearing block (48); and a plurality of first sealing rings (251) are embedded in an end face of the water isolation ring (25) that faces the circular table (605).

8. The cleaning apparatus for the quartz tube according to claim 7, wherein the rotary seal apparatus further comprises a second sealing ring (26) arranged above the bearing table (21) and enclosing the inner spray tube (45) and a locking ring (27) pressing the second sealing ring (26).

9. The cleaning apparatus for the quartz tube according to claim 7, wherein a first buffer ring (22), a second buffer ring (23) and a rigid bottom plate (28) which are arranged in an attached manner from top to bottom are integrally embedded in the bottom of the bearing table (21), and the rigid bottom plate (28) is fixedly connected to the adapter cylinder (24).

10. A cleaning method for a quartz tube, wherein the quartz tube in an inverted state is cleaned and dried sequentially by means of the cleaning apparatus for the quartz tube of claim 1.

* * * * *